United States Patent [19]
Everitt et al.

[11] Patent Number: 4,798,814
[45] Date of Patent: * Jan. 17, 1989

[54] OXIDATION RESISTANT ALUMINA-SILICA ARTICLES CONTAINING SILICON CARBIDE AND CARBON

[75] Inventors: George F. Everitt; Terence P. Johnson; Lien-Huong A. Pham, all of St. Paul, Minn.

[73] Assignee: Minnesota Mining and Manufacturing Company, St. Paul, Minn.

[*] Notice: The portion of the term of this patent subsequent to Mar. 22, 2005 has been disclaimed.

[21] Appl. No.: 88,903

[22] Filed: Aug. 24, 1987

Related U.S. Application Data

[63] Continuation-in-part of Ser. No. 912,829, Sep. 26, 1986.

[51] Int. Cl.4 ............................................. C04B 35/56
[52] U.S. Cl. ....................................... 501/89; 501/90; 501/95; 501/100; 501/133
[58] Field of Search ..................... 501/89, 90, 95, 100, 501/133

[56] References Cited

U.S. PATENT DOCUMENTS

| | | | |
|---|---|---|---|
| 3,385,915 | 5/1968 | Hamling | 264/65 |
| 3,632,709 | 1/1972 | Hayes et al. | 264/63 |
| 3,663,182 | 5/1972 | Hamling | 23/355 |
| 3,709,706 | 1/1973 | Sowman | 106/57 |
| 3,795,524 | 3/1974 | Sowman | 106/65 |
| 3,846,527 | 11/1974 | Winter et al. | 264/63 |
| 3,982,955 | 9/1976 | Marsmann et al. | 501/95 |
| 4,010,233 | 3/1977 | Winter et al. | 264/63 |

FOREIGN PATENT DOCUMENTS 1287288 12/1969 United Kingdom .

Primary Examiner—William R. Dixon, Jr.
Assistant Examiner—David M. Brunsman
Attorney, Agent, or Firm—Donald M. Sell; Lorraine R. Sherman

[57] ABSTRACT

A shaped article comprises a continuous alumina-silica of alumina-boria-silica first phase, an in-situ generated discontinuous carbon second phase, and a discontinuous silicon carbide third phase, said article being stable to an oxidative atmosphere when heated to 1300° C. for at least 2 hours.

22 Claims, No Drawings

OXIDATION RESISTANT ALUMINA-SILICA ARTICLES CONTAINING SILICON CARBIDE AND CARBON

This application is a continuation-in-part of application Ser. No. 06/912,829, filed Sept. 26, 1986.

FIELD OF THE INVENTION

This invention relates to an oxidation resistant ceramic shaped article comprising a continuous alumina-silica or alumina-boria-silica phase, a discontinuous carbon phase, and a discontinuous silicon carbide phase. In another aspect, it relates to a process for preparing ceramic shaped articles of the invention. The shaped articles are useful in high heat emissivity applications.

BACKGROUND ART

Within the last decade, an amount of literature has been published describing various polycrystalline, microcrystalline, or non-vitreous fibers and other shaped articles of refractory metal oxides. These articles are made by various non-melt processes, such as by drying films of solutions of oxygen-containing metal compounds, or drying organic polymeric bodies, such as cellulose or rayon, impregnated with such a solution, or by extruding and drawing, or spinning, viscous fluids of such metal compounds into fibers. The articles are then heated to remove water, organic material, and other volatile material to produce refractory articles.

Art in the area of polycrystalline inorganic fibers includes British Pat. No. 1,287,288, U.S. Pat. Nos. 3,385,915, 3,632,709, 3,663,182, 3,846,527 and the art cited in U.S. Pat. Nos. 3,709,706 and 3,795,524. Oxide fibers other than those identified as fiberglass are still in the relatively early stage of development.

In many technologies, there is a need for a relatively inexpensive continuous refractory fiber product with desirable physical properties, such as high strength, high heat emissivity, high modulus of elasticity, chemical resistance, and the retention of such properties after exposure to high temperatures beyond the capability of presently commercially available fiber materials.

U.S. Pat. No. 4,010,233 broadly discloses inorganic fibers comprising a metal oxide phase and a finely divided carbon dispersed phase. There are no examples drawn to alumina-silica fibers containing carbon and silicon carbide as the dispersed phases or to the superior stability in an oxidative atmosphere provided by such fibers.

SUMMARY OF THE INVENTION

Briefly, the present invention provides a shaped article comprising a continuous alumina-silica or alumina-boria-silica matrix first phase, an in-situ generated discontinuous carbon second phase, and a discontinuous silicon carbide third phase, said article being stable to an oxidative atmosphere when heated at 1300° C. for at least 2 hours.

In another aspect, a process is disclosed for providing shaped articles such as fibers, flakes, beads, bubbles, granules, or small molded shapes which are black in color and have high heat emissivity. In addition to the inorganic oxide refractory components, the refractory shaped articles contain a dispersed carbon phase which is resistant to a high temperature oxidative atmosphere. The black alumina-silica and alumina-boria-silica articles have utility in high emissivity applications. Also silicon carbide is incorporated into the precursor solution or suspension to provide 1 to 30 weight percent SiC in the shaped article. Silicon carbide enhances the retention of the black color in the article after high temperature treatment (e.g., 1300° C. for 20 to 50 hours).

The shaped articles of the present invention can be made by a non-melt process comprising forming a viscous concentrate of a precursor liquid into the desired shape and then dehydratively or evaporatively gelling or hydrolyzing the shaped articles. These articles can subsequently be dried to result in "green" or non-refractory shaped articles. Heating and firing the shaped green article removes water, decomposes and volatilizes undesired fugitive constituents, and converts them into the refractory shaped articles of the invention. Preferably, the shaped articles are fibers.

The silica matrix component of the present invention originates from at least one of an organosilane, a silica sol (e.g. amorphous silica), and a source containing silicon carbide. SiC powder generally contains a small percentage of amorphous silica as an impurity. The amorphous silica impurity will contribute to the silica content of the final article. If pure silicon carbide is used the silica matrix component will be derived only from a silane and/or silica sol. In all cases, the resulting article will be black and oxidatively stable.

In this application:

"ceramic" means inorganic non-metallic material consolidated by the action of heat, such as metal and non-metal oxides;

"sol" means a fluid solution or a colloidal suspension of metal and nonmetal oxides and compounds;

"non-vitreous" means not formed from a melt of the oxide composition;

"green" refers to the ceramic articles which are unfired, uncalcined, untreated or incompletely treated, that are not in their final ceramic form;

"amorphous" means a material having a diffuse x-ray or electron diffraction pattern without definite lines to indicate the presence of a crystalline component;

"crystalline" means a material having an x-ray diffraction pattern characteristic of the material;

"dehydrative gelling" or "evaporative gelling" mean that sufficient water and volatile material are removed from the shaped green fibers (or other articles) so that the form or shape of the fiber is sufficiently rigid to permit handling or processing without significant loss or distortion of the desired fibrous form or shape. Therefore, all the water in the shaped fiber need not be removed. Thus, in a sense, this step can be called partial dehydrative gelling. Inclusion of silicon carbide renders the green fibers opaque and either dark brown or black.

"continuous fiber" means a fiber (or multi-fiber article such as a strand) which has a length which is infinite for practical purpose as compared to its diameter;

"continuous alumina-silica or alumina-boria-silica matrix first phase" means a homogeneous alumina-silica or alumina-boria-silica phase in which can be embedded a dispersed carbon phase, particles of the carbon phase being submicron in diameter; an additional dispersed phase comprises silicon carbide;

"stable" means retention of at least 40 weight percent, preferably 40 to 70 weight percent, and more preferably 40 to 90 weight percent of the carbon present in the elemental form after heating for 0.5 hour at 1300° C. in an air atmosphere; and "mullite" means an aluminum silicate crystalline compound having an alumina/silica mole ratio of 3/2 and requires heating the oxide precursors to a temperature of about 1200° C.

Shaped articles having a ceramic matrix and dispersed therein silicon carbide particles, the articles having high modulus of elasticity, are disclosed in Assignee's copending patent application, U.S. Pat. No. 912,830, filed Sept. 26, 1986.

DETAILED DESCRIPTION

In a preferred embodiment, the present invention provides a shaped article comprising a continuous alumina-silica first phase, said first phase comprising 55 to 98 weight percent of the total composition of a mixture or chemical combination of 65 to 80, preferably 72 to 77, weight percent alumina and 35 to 20, preferably 28 to 23, weight percent silica, an in-situ generated discontinuous carbon-containing second phase, said carbon second phase comprising 1 to 20, preferably 5 to 15, weight percent of the total fired composition, and discontinuous third phase which contains silicon carbide in an amount of 1 to 30, preferably 10 to 30, and most preferably 15 to 25 weight percent of the total composition, said article being stable to an oxidative atmosphere when heated at 1300° C. for at least 2 hours, preferably for 20 to 50 hours.

Preferably, the shaped article of the invention is a continuous fiber. The continuous alumina-silica fiber contains a dispersed carbon phase and a dispersed silicon carbide phase, and is flexible, black, and strong. With compositions having alumina and silica in ratios of 72–77 weight percent $Al_2O_3$ (preferably 72 weight percent alumina) to 28–23 weight percent $SiO_2$, (preferably 28 weight percent silica) and dispersed carbon and silicon carbide phases, the mole ratio of alumina to silica is in the range of 3:2 to 2:1. Conversion to mullite at temperatures of 1200° to 1400° C. resulted in continuous fibers with excellent resistance to fracturing and resistance loss of carbon.

In another embodiment, the shaped article of the present invention provides a continuous fiber having an alumina-boria-silica first phase and an in situ generated discontinuous carbon second phase and a mechanically added silicon carbide third phase, said first phase comprising 65 to 94 weight percent of a composition comprising a mixture of 60 to 65 weight present alumina, 25 to 35 weight percent silica, and up to 15 weight percent boria (preferably 0.25 to 15 weight percent boria, more preferably 0.25 to 5 weight percent), said second phase comprising 1 to 5 weight percent carbon, and a third phase comprising 5 to 30, preferably 10 to 30, weight percent silicon carbide, the article being stable to an oxidative atmosphere when heated at 1300° C. for at least 20 hours when boria is present in small amounts. If large amounts (about 10 to 15 weight percent) of boria are present, the article is stable in an oxidative atmosphere at 1300° C. for at least two hours.

The ceramic fibers of the present invention are made by a non-melt process comprising shaping a mixture of viscous concentrates of a precursor liquid into a fiber form and then dehydratively or evaporatively gelling or hydrolyzing the drawn or spun fibers. These fibers can subsequently be dried to result in "green" or non-refractory fibers. Heating and firing the shaped green fibers removes water, decomposes and volatilizes undesired fugitive constituents and converts them into the refractory fibers of the invention.

The starting material or fiber precursor composition from which the first phase of the refractory fibers of this invention can be made comprises silica present in the final article from at least one of a silane compound and a silica sol and a compatible aqueous solution or dispersion of a water-soluble or dispersible aluminum compound. The silicon and aluminum compounds are those compounds which can be calcined to the respective oxides, i.e., silica and aluminum oxide.

More particularly, the general procedure to prepare the fibers is a modification of that described in U.S. Pat. No. 4,047,965.

Aluminum formoacetate (Niacet[198], Niacet Corp., Niagara Falls, N.Y.) is dissolved in boiling water to give a clear solution containing the equivalent of about 10 percent alumina by weight. Low molecular weight alkyl alcohol ($C_1$ to $C_3$), for example isopropyl alcohol, is slowly added to the hot solution which is being rapidly stirred.

An alternative source of alumina can be made from aluminum powder, formic acid, acetic acid and water. For example, the aluminum powder (120 grams) can be dissolved in a 90° C. solution of 2200 grams water, 236 grams formic acid, and 272 grams acetic acid, over a perood of eight hours.

Suitable aluminum compounds which can be used as alumina precursors representatively include water-dispersible alumina sols and water soluble aluminum compounds such as aluminum formoacetate, $Al(OH)(OOCH)(OOCCH_3)$, or aluminum isopropylate $Al(OC_3H_7)_3$ and mixtures thereof, the organic aluminum compounds being preferred, particularly aluminum formoacetate (prepared as disclosed above). Aluminum chloride is not a preferred source because of the possibility of chlorine retention which is undesirable. In fact, the fiberizable liquid from which the fracture resistant fibers of this invention are made should be essentially free of chloride, i.e., the chloride is less than about 1 weight percent, based on the total equivalent oxide weight. Thus, the green fibers are likewise essentially free of chloride and the refractory fibers made therefrom have at most a trace of chloride, the presence of significant amounts of chloride in the refractory fibers, e.g., 0.2 weight percent, having been found to be coincident with fragile fibers.

Generally, sol stabilization aids are added to the alumina precursor solution. Preferred aids are lactic acid and formamide or its dimethyl derivative. These are used in a weight ratio of about 65% and 30%, respectively, based on alumina content of the mixture.

The silica source can be important in the making of oxidation resistant carbon containing fibers. Silica in the resulting ceramic fiber can originate from one or more sources. Preferably, the silica source is a nonchlorine-containing organosilane, most preferably a trialkoxy organo-functional silane or a tetraalkoxysilane. Another silica source which can be present alone (when boria is present in an amount of at least 10 weight percent of the first phase in the fired fiber) or in combination with the organosilane can be an amorphous silica which can be derived from a dry powder or from a liquid sol. In addition, a percentage of slica (up to 40 weight percent but usually up to about 2 weight percent of the silicon carbide) can be derived from a source for silicon carbide which is added as silicon carbide powder or partially oxidized silicon carbide powder. When a silane is used it can be added to the aluminum-containing solution in one-fourth increments and allowed to hydrolyze completely in about 5 to 20 minutes depending on the solution temperature (40° to 80° C.). This procedure can be repeated until the silane is completely added. Optionally, the amorphous silica can be added to the cooled solution. A preferred ratio of silane to isopropyl alcohol is 60 parts silane to 100 parts alcohol by weight. In the case of alumina-silica fibers with no or very low boria content (0 to 2 weight present) of the total silica used, an organosilane first component is the silica source for 75–100 weight percent of the total silica in the refractory fiber. Of the remaining silica, 25–0 weight percent of the total is derived from either dry amorphous silica or liquid form silica sol. A preferred silane is tetraethoxysilane because it produces ethyl alcohol on hydrolysis which is compatible with the lower alkyl alcohol (preferably isopropyl alcohol) in the system. When using dry amorphous silica, an ultrasonic disperser can be used to ensure a good dispersion. Subsequently, the sol can be filtered through a 10 micrometer filter to the larger remaining agglomerates.

In the case of alumina-boria-silica the silica source preferably is an organosilane but it can be amorphous silica alone or the two sources in combination in any proportion. As noted above, generally a small percentage of silica is derived from the source of SiC.

Silanes useful in the present invention include the hydrolyzable monomers of the type $SiR_4$ or $SiR_xR'_{(4-x)}$ where R and R' are independently either an organofunctional group or a hydrolyzable group, and x has a value of 0,1,2,3, or 4. For instance, for $SiR_4$, if R is $OC_2H_5$, a hydrolyzable group, then the hydrolyzable monomeric starting silane is tetraethoxysilane (TEOS). Hydrolysis in water is believed to take place as shown by the equation:

$$4H_2O + Si(OC_2H_5)_4 \rightarrow Si(OH)_4 + 4C_2H_5OH$$

to form a reactive silanol with a limited life. If the silane contains a mixed ligand, e.g. when R is a hydrolyzable ethoxy group and R' is the organofunctional group $H_2N(CH_2)_3-$, the silane is believed to hydrolyze according to the following equation:

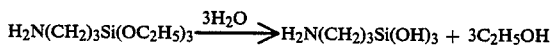

$$H_2N(CH_2)_3Si(OC_2H_5)_3 \xrightarrow{3H_2O} H_2N(CH_2)_3Si(OH)_3 + 3C_2H_5OH$$

Again, this hydrolyzed monomer has a limited storage life. The varieties of R and R' available are extensive. Any R or R' group can be useful so long as a volatile, a water-miscible (usually an alcohol) or an insoluble hydrolysis byproduct is produced. Alkoxy groups ($C_1$ to $C_6$) such as the methoxy, ethoxy, propoxy and butoxy are useful R groups in the practice of this invention. The R' organofunctional groups can be, for example, aliphatic amino and diamino groups ($C_1$ to $C_6$), alkenyl groups ($C_2$ to $C_6$), mercapto groups ($C_0$ to $C_6$), epoxy or (meth)acryloxy groups ($C_2$ to $C_6$).

Silanes particularly preferred in the practice of the invention include tetraethoxysilane (TEOS) made by Petrarch Systems, Inc., gamma-aminopropyltrimethoxysilane (A-1100 ™, Union Carbide), and gamma-glycidoxypropyltrimethoxysilane (A-187 ™, Union Carbide).

When silica is derived from a silica sol, a precursor silica sol. can be used with $SiO_2$ concentrations of 1 to 50 weight percent, and preferably 15 to 35 weight percent, sols of the latter concentrations being commercially available. The silica sol is preferably used as an aqueous dispersion or aquasol. The preferred silica is Nalco ™ 1034-A (Nalco Chemical Company, Chicago, Ill.) an aqueous acid system. A second source of amorphous silica is 14 nanometer amorphous silica known as Cab-O-Sil ™, M-5 grade, available from Cabot Corp., Tuscola, Ill.

The presence of a silane in the precursor sol can be important to formation of the dispersed carbon second phase in the shaped articles of the invention. However, the source of the carbon can be any one of or a combination of carbon-containing materials used in the precursor sol. For example, the second phase carbon can originate from any one or any combination of the carbon-containing acetate or formate groups from aluminum formoacetate (Niacet), lactic acid, or formamide. The amount of these additives used can effect the carbon content of the final ceramic article. For example, if the lactic acid content is increased, the amount of carbon in the final article also increases.

It is known in the art that fibers made with either dry silica or silica sol as the only silica source become carbon-free white alumina-silica fibers when calcined in air. It is also known that such fibers fired in a reducing or inert atmosphere will retain carbon from organic components and have a black color. However, such carbon-containing black fibers when subjected to high temperature, e.g., 1200° C. or higher, in an oxidative atmosphere will become carbon-free and white in color in a short time. Usually such fibers have inferior physical properties (e.g., they fracture readily).

SiC is present in the alumina-silica fiber of the invention in the range of 1 to 30 parts by weight, preferably 10 to 30 parts by weight, of the total composition. SiC aids the retention of carbon in a 1300° C. oxidative atmosphere. The SiC can be made either by plasma synthesis or by carbothermal synthesis.

The silicon carbide particles can be produced by plasma synthesis (from Los Alamos National Laboratory [LANL]) or by carbothermal processing

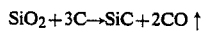

$$SiO_2 + 3C \rightarrow SiC + 2CO \uparrow$$

where carbon black is dispersed into a silica sol, dried, crushed and fired in a vacuum furnace at 1400° C. Any residual carbon can be burned off by heating, for example, at 550° C. for 16 hours. The resultant SiC material is ball milled in a solvent (acetone) and filtered to provide the desired particle size.

The consistency of mechanical properties is related to the quality of the SiC dispersion in the precursor system. Silicon carbide in powder form (20nm) can be dispersed into the alumina-silica or alumina-boria-silica precursors by sonicating a mechanical dispersion. A preferred method is to partially oxidize the SiC by heating at 600° C. in air for about three hours. The oxidized SiC is mixed into the precursor sol and fully dispersed by sonication.

Mullite (crystalline alumina-silica) fibers of the present invention containing carbon and SiC phases remained stable and black after exposure for 22 hours at 1300° C. in air.

A further improvement in fiber properties can be realized by using partially oxidized SiC. Fibers prepared with the partially oxidized SiC can retain carbon for more than 50 hours at 1300° C. and can possess higher tensile strength of up to 2587 MPa ($375 \times 10^3$ psi) and elastic modulus of 250 GPa ($36 \times 10^6$ psi).

By using partially-oxidized SiC it was also possible to prepare high emissivity alumina-boria-silica (3:1:2 mole ratio) fibers. This could not be achieved without the partially oxidized silicon carbide.

The oxidized SiC may shift the composition of the final fiber because oxidized SiC provides a third source of silica. For example, if 20% (wt) oxidized SiC (itself 42% SiO:) is added to an alumina-boria-silica fiber (3:1:2 mol ratio) the final fiber composition will shift to 12% SiC (3:1:3 mol ratio alumina-boria-silica).

The presence of more than about 10 weight percent boria changes the requirement of using an organic silane and a silica sol to produce a black oxidatively stable article. Surprisingly, a black article within the invention can be provided using a single silica source when boria and SiC are included as components.

Details of the process of the invention are as follows:

The fiber precursor material initially can be a relatively dilute liquid, generally containing about 10–30 weight percent equivalent oxide, which can be calculated from a knowledge of the equivalent solids in the original materials and the amount used, or determined by calcining samples of the components starting materials. For the preparation of fibers, it is necessary to concentrate or viscosify the dilute liquid in order to convert it to a viscous or syrupy fluid concentrate which will readily gel when the concentrate is fiberized and dehydrated, for example, when the concentrate is extruded and drawn in air to form the fibers. For example, the mixture can be concentrated with a Rotovapor TM flask (Buchi/Brinkmann Rotary Evaporator, Brinkmann Instruments Inc., Westbury, N.Y.) under vacuum. The concentration procedures are well known in the prior art, see U.S. Pat. No. 3,795,524. Sufficient concentration will be obtained when the equivalent solids content is generally in the range of 25 to 55 weight percent (as determined by calcining a sample of the concentrate), and viscosities (Brookfield at room temperature) are in the range of 10,000 to 1,000,000 mPa sec, preferable 40,000 to 100,000 mPa sec, depending on the type of fiberizing or dehydrative gelling technique and apparatus used and the desired shape of the gelled fiber. In making bubbles or beads, which utilize a dehydrating liquid rather than drying air, or a chemical gellation technique, a low viscosity (10 to 500 mPa sec) is preferred.

In making continuous fibers which can comprise 55 to 99 weight percent of the total composition of a mixture or chemical combination of (1) 65 to 80 weight percent alumina, and
(2) 35 to 20 weight percent silica which can be derived from
75 to 100 weight percent of an organosilane and 25 to 0 weight percent amorphous silica, and
(3) 1 to 30 weight percent silicon carbide, the viscous concentrate can be extruded through a plurality of orifices (e.g., a total of 10 to 1000) from a stationary head and resulting green fibers allowed to fall in air by the force of gravity or drawn mechanically in air by means of drawing rolls or a drum or winding device rotating at a peripheral speed faster than the rate of extrusion. The concentrate can also be extruded through orifices blown by a parallel, oblique or tangential stream of high pressure air, such as in the making of blown microfibers, the resulting blown green fibers being in essentially staple or short form with lengths generally 25 cm or less (rather than the continuous filament form) and collected on a screen or the like in the form of a mat. Any of these forces exerted on the extruded, green fibers cause attenuation or stretching of the fibers, and can reduce their diameter by about 50 to 90 percent or more and increasing their length by about 300 to 1,000 percent or more and serving to hasten or aid the drying of the green fibers.

The dehydrative gelling of the green fibers can be carried out in ambient air, or heated air if desired, for faster drying. The drying rate can affect the shape of the fiber. The relative humidity of the drying air should be controlled since excess humidity will cause the gelled green fibers to stick together and excessively dry air tends to result in fiber breakage. Generally, air with relative humidity in the range of 20 to 60 percent at an operative temperature of 15°–30° C. is most useful, although drying air temperatures of 70° C. or more can be used. Continuous green fibers are made and gathered together in parallel alignment of juxtaposition in the form of a multi-fiber strand.

The fibers in the green or unfired gel form are dry in the sense that they do not adhere or stick to one another or other substrates and feel dry to the touch. However, they still may contain water and organics, and it is necessary to heat and fire the green fibers in order to remove the remaining fugitive materials and convert the green fibers into refractory fibers. The green fibers in their continuous form are preferably gathered or collected in the form of a strand, the strand then accumulated in a relaxed, loose, unrestrained configuration of offset or superimposed loops as in a "FIG. 8" in preparation for firing. These green fibers can be heat treated by placing them in a box furnace or a belt furnace with an air atmosphere wherein the temperature is raised from room temperature to 900° to 1200° C. in a period of about 1 hour. Generally, at about 900° C. or above the fibers begin to assume crystalline form.

The black fibers can be further heat treated to about 1300° C. in air and still retain the dispersed carbon phase. These black, high temperature fibers have utility where thermal emissivity is needed, e.g., space shuttle tile for re-entry protection.

In firing the green fibers, care should be exercised to avoid ignition of combustible organics in the fiber, volatile byproducts and fiber size. Such ignition may cause excessive crystallization and defects leading to embrittlement and poor quality fiber or even dust, controlled rates of heating can be used to volatilize the combustibles so as to avoid ignition.

The shaped articles of the invention can be useful in composites. For example, fibers can be used as one component in a mixed fiber composite structure and impart a retainable black color in the composite. Such a composite can provide heat emissivity properties to lightweight structures.

The procedure for testing tensile strength used a metal chain attached to a single fiber. The load applied to the fiber was measured by increasing the chain length electromechanically until a break occurred and then weighing the minimum length of chain necessary for break. The tensile strength (TS) is calculated as $$TS = (W/A)$$

wherein
W = weight of chain length at break
A = cross-section area of the fiber.

The modulus of elasticity was determined from flexural vibration as described by E. Schreiber and others in *Elastic Constants and Their Measurement* (New York; McGraw-Hill, 1973, Chpt. 4.4) The general equation which relates modulus of elasticity (Young,s modulus) and the flexural resonant frequency ($f_E$) is:

$$E = \frac{(2\pi l^2 f_E)\rho T}{Km^2}$$

wherein K=radius of gyration of the cross-section about the axis perpendicular of the plane of vibration.

m=constant depending on the mode of vibration.

T=shape factor, which depends upon the shape, size, and Poisson's ratio of the specimen and the mode of vibration.

l=length of the specimen.

$\rho$=density.

Objects and advantages of this invention are further illustrated by the following examples, but the particular materials and amounts thereof recited in these examples, as well as other conditions and details, should not be construed to unduly limit this invention. All percents are by weight unless otherwise stated. In all cases, unless otherwise stated the fibers of the invention were stable to an oxidative atmosphere when heated to 1300° C. for at least 2 hours.

EXAMPLE 1

High emittance fibers of 20 wt % SiC in an alumina-silica matrix of mole ratio 3:2 (mullite) were prepared by the following process. An alumina precursor solution was made by dissolving 240 grams aluminum powder in a hot solution of 4400 grams water, 472 grams formic acid (88 wt. percent solution) and 544 grams acetic acid. The mixture was heated at a temperature of more than 90° C. for up to eight (8) hours to dissolve most of the metal powder. Hydrogen gas was evolved during this reaction. The resulting solution was cooled to room temperature. There was then present an alumina precursor of 8.33 percent (based on fired solids).

Lactic acid (6 grams of an 85 wt. percent aqueous solution), formamide (2.75 grams) were added to a 119 gram portion of the alumina precursor solution. The resulting mixture was concentrated in a rotating flask to about half of its volume.

A dispersion was made by gradually adding 3.46 grams of ultrafine SiC (LANL) to 13.5 grams well-stirred triethoxysilane (TEOS) (Petrarch Systems, Inc., Bristol, Pa.) and then diluting with 6.8 grams isopropanol. The diluted dispersion was sonicated in a Branson Sonifier TM (Branson Cell Disruptor, Smith-Kline Co., Shelton, Conn.) for 10 minutes.

The sonicated dispersion was stirred into the concentrated aluminum formoacetate above, allowed to hydrolyze at 99° C., then resonicated for another ten minutes. The resulting sol was concentrated under vacuum in a Rotovapor TM flask (Rotovapor TM flask, Buchi/Brinkmann Rotary Evaporators, Brinkmann Instruments, Inc., Westbury, N.Y.) partly submersed in a water bath at a temperature of 35° to 45° C. until it was viscous enough to enable the pulling of fibers with a glass rod. Fibers were formed by extruding this concentrate through a spinnerette having 40 holes, 102 micrometer in diameter, and collecting the fibers on a rotating 28.0 cm diameter drum placed 17.8 cm below the spinnerette. The black and continuous fibers were cut and removed from the drum in 10 cm long bundles.

A portion of these fibers was fired in air in an electric furnace (Lemont TM KHT 250, Lemont Scientific Co., State College, Pa.) at a rate of temperature increase of 7.5° C. per min. with a 30 min. soak at 900° C. and another 30 min. soak at 1150° C. The fibers were refired in air at 1300° C. for one hour. These 1300° C. fired fibers were black, shiny and oval in cross section. The only crystalline material discernible by X-ray powder diffraction analysis was mullite. The presence of SiC was confirmed by x-ray photoelectron spectroscopy. These fibers had a tensile strength of 896 MPa ($130 \times 10^3$ psi) and an elastic modulus of 248 GPa ($36 \times 10^6$ psi).

Another portion of green fibers was fired in a belt furnace 10 meters long from room temperature to 1150° C. over about a one hour period. These fibers contained 2.5% carbon. After heat treatment at 1300° C. for 16 hours in air they contained 1.6% carbon. The fibers retained a black color under the following conditions: 2 hours at 1400° C.; 22 hours at 1300° C.; and, more than 55 hours at 1200° C.

EXAMPLE 2

Materials and procedure of EXAMPLE 1 were followed, except different concentrations of the SiC were used.

|  | SiC | TEOS | alumina source (18% conc)* | Isopropyl alc. |
|---|---|---|---|---|
| 1st Run | 0.15 g | 1.35 g | 5.5 g | 1.0 g |
| 2nd Run | 3.4 | 9.2 | 37.0 | 4.6 |

*Example 1

The resulting fibers were fired in air in an electric furnace (Lemont KHT 250) at 1300° C. for one hour. The rate of temperature increase was 7.5° C. per min. with a 30 min. soak at 900° C. and another 30 min. soak at 1150° C. The fired fibers were all black and shiny. The fibers from the first run had 9.8 wt percent SiC. A bundle of these felt soft and remained black in color at 1300° C. for 4 hours. Fibers from the second run had 26.8 wt percent SiC, were relatively stiff and remained black in color at 1300° C. up to 22 hours.

EXAMPLE 3

To illustrate the effect of using partially oxidized SiC (LANL) the following procedure was used. SiC powder (LANL) (1.7 grams) was partially oxidized at 600° C. for 3 hours in a Lindberg[198] furnace (Lindberg Furnace Co., Watertown, Wis.). The partially oxidized SiC was suspended into 85 grams of alumina-silica precursor prepared as follows: 35g lactic acid and 16g formamide were added to 700 g aluminum precursor solution (according to the procedure of Example 1). Then 71 g TEOS (which was diluted with 71 g methanol) was added and completely hydrolyzed. The 1.7 g SiC was completely dispersed in 85 g alumina-silica precursor solution with a Branson Sonifier which was run for 10 minutes. The resulting mixture was filtered, concentrated and extruded in the typical process to give dark brown unfired fibers. A portion of these green fibers were fired on a belt furnace 10 meters long using a temperature cycle as in Example 1, from room temperature to 1000° C. in about 50 minutes, held for 15 minutes then increased to 1150° C. in about 1 minutes.

The 1150° C. fired fibers were black and shiny and felt very strong when gripped between the index finger and thumb of each hand and were pulled to break.

Another portion of green fibers was fired in air in an electric tube furnace (Lemont KHT 250) at a rate of 7°

C. increase per minute with a 30 min. soak at 900° C. and another 30 min. soak at 1150° C. They were then heat-treated at 1300° C. in air for one hour.

The fibers which were fired at 1300° C. remained black for 50 hours at 1300° C. A calculation based on the amount of silica in the oxidized SiC powder indicated that the fiber contained 12 weigh percent of SiC in a matrix of 3 alumina : 2.6 silica (mole ratio). The only crystalline material discernible by X-ray diffraction analysis was mullite.

EXAMPLE 4

Alumina-silica precursor (prepared as in Example 3) 200 grams was heated to boiling, boric acid, 0.76g, was stirred into the alumina-silica sol and heated for about 1 minute. The precursor sol was cooled rapidly and filtered through a No. 54 Whatman filter paper. 1.5 g of partially oxidized SiC (LANL ™) (see Example 3 for method) was heated in air for three hours at 600° C. to partially oxidize the SiC. The SiC was stirred into 64.12 g of the alumina-boria-silica sol. The dispersion was sonicated for 10 min. then filtered through a No. 54 Whatman filter again. The resulting sol was concentrated at 42° C. under vacuum to a fiberizable condition, e.g. a fiber formed with a glass rod. The concentrate was extruded using a spinnerette with 40-76 micrometer diameter holes and using an extrusion pressure of 1.38 MPa (200 psi). The continuous dark brown fibers were fired on a belt furnace (see EXAMPLE 1). The temperature was raised from room temperature to 1125° C. in about 50 minutes, held for 15 minutes, then increased to 1175° C. and held for 15 minutes.

The 1175° C. fired fibers were black, shiny, and very strong. The fibers were further fired at 1300° C. in air for 16 hours and retained the black color.

EXAMPLE 5

The material and procedure of Example 4 were utilized except that the concentrated sol was extruded through the orifices into a high pressure air stream. The resulting blown green fibers were collected on a screen in the form of a mat 1.25 cm (0.5 inches) thick. The fibers were brown and became dark brown when fired to 1175° C. in a belt furnace, as described in Example 4. The microfibers turned to a grey color when heated to 1300° C. and remained grey for a 16 hour heating period. At 1350° C., the fibers lost some of the grey color after two hours of heating and became a mixture of grey and white.

EXAMPLE 6

The material and procedure of Example 4 were utilized except 5.3 g of boric acid was used to make the sol. This gave a precursor having a 3:1:2 mole ratio of alumina:boria:silica. Partially oxidized SiC (1.5 g) as described in Example 3, was dispersed in 57.9 g of the alumina:boria:silica sol. The fibers obtained from this sol were dark brown in color, and were fired in the Lemont ™ furnace in air to 1300° C. and held for 1 hour. The furnace heating rate was 7.5° C./minute. The fired fibers were black and shiny. The fibers maintained their black color after 3 hours at 1300° C.

The calculation based on the amount of silica in the oxidized SiC powder indicated that the fiber contained 12% SiC in a matrix of 3.0 alumina : 1.0 boria : 2.6 silica (mole ratio). EXAMPLE 7

Alternative ingredients were used to make black ceramic fibers. Aluminum acetate stabilized by boric acid, 11.6 grams, (Niaproof[198], Niacet Corporation, Niagara Falls, N.Y.) was stirred into 30 ml water to provide an alumina-boria source for the desired fibers. After the Niaproof dissolved, 1.5 grams lactic acid (85% solution), 1.2 grams formamide and 2.6 grams silica sol (Nalco 1034A) were added successively. Then 1.7 grams partially oxidized SiC (Example 3) were dispersed and sonicated for 10 minutes. The resulting suspension was filtered through a Whatman no. 4 filter paper, concentrated, extruded, and collected on a wheel (Example 1).

Portions of the unfired fibers were fired to three different temperatures —950°, 1150° and 1300° C. and held for 15 minutes. Black fibers were obtained in all cases. In addition, when samples of each portion were heat treated at 1300° C. for 2 hours in air all the samples remained black.

EXAMPLE 8

The materials and procedures of Example 1 were used to make black fibers except SiC powder made by carbothermal synthesis was used in place of the plasma-produced SiC. The raw materials for the SiC were a 3:1 molar ratio of carbon black (Monarch ™ 1100, Cabot Corp., Glen Ellyn, Ill.) and silica sol (Nalco[198] 2327, Nalco Chemical Company, Oakbrook, Il.). The following equation describes the synthesis:

$$SiO_2 + 3C \rightarrow SiC + 2CO \uparrow.$$

The carbon black was dispersed into the silica sol, dried, crushed and vacuum fired in an Astro[198] furnace (Astro Industries, Inc., Santa Barbara, Calif.) at 1400° C. for five hours. Then the excess carbon was burned off by heating at 550° C. for 16 hours.

This SiC powder had a particle size range of $6 \times 10^{-5}$ to $9 \times 10^{-5}$ mm (600 to 900 Angstroms). Coarse particles had been separated from the powder by ball milling in acetone solvent for 20 hours. The dispersion was filtered through a No. 4 Whatman filter and refiltered through a Balston filter tube grade CQ. The acetone was evaporated. SiC powder (2.42 g) were dispersed in 9.45 g TEOS, 5 g isopropyl alcohol and 38.5 g of aluminum formoacetate (concentrated to 18 percent) and spun into fibers as in Example 1.

The fibers were fired to 1300° C. and held at that temperature for 1 hour. The furnace cycle used a rate of 7° C. rise per minute with a 30 min. soak at 900° C. and another 30 min. soak at 1150° C. The fibers were black and had an average tensile strength of 782 MPa (113,000 psi) and an average modulus of elasticity of 283 GPa ($41 \times 10^6$ psi). X-ray diffraction analysis revealed mullite with SiC. The 1300° C. fired fibers turned greyish black after 18 hours at 1300° C. The coarser SiC particles resulting from the carbothermal process were identified in the final fiber by x-ray diffraction.

EXAMPLE 9

SiC powder (3.675 g) prepared as in Example 8 was ball milled in 150 g alumina-silica sol (at a 9.8 weight percent oxide solids) for 72 hours. The dispersion was filtered first through a Whatman No. 4 then a Whatman No. 54 filter. The precursor sol was concentrated as in Example 1. Fibers were spun using a 40 hole spinnerette with 76 micrometer (3 mil) diameter orifices and using a pressure of 1.21 MPa (175 psi) for the extrusion. The fibers were black when fired using the firing schedule as described in Example 8. The fibers were fired in air at 1300° C. and remained black for 24 hours. After 30 hours at 1300° C. the fibers had begun to turn to a grey color.

Various modifications and alterations of this invention will become apparent to those skilled in the art without departing from the scope and spirit of this invention, and it should be understood that this invention is not to be unduly limited to the illustrative embodiments set forth herein.

We claim:

1. A shaped article comprising a continuous alumina-silica or alumina-boria-silica matrix first phase, an in-situ generated discontinuous carbon second phase, and a discontinuous silicon carbide third phase, said article being stable to an oxidative atmosphere when heated at 1300° C. for at least 2 hours.

2. A shaped article comprising a continuous alumina-silica first phase, said first phase comprising 55 to 98 weight percent of the total composition of a mixture or chemical combination of 65 to 80 weight percent alumina and 20 to 35 weight percent silica, an in-situ generated discontinuous carbon-containing second phase, and a mechanically added discontinuous silicon carbide third phase, said carbon second phase comprising 1 to 20 weight percent of the total composition, and said silicon carbide third phase comprising 1 to 30 weight percent of the total composition, said article being stable to an oxidative atmosphere when heated at 1300° C. for at least 2 hours.

3. The article according to claim 2 wherein said carbon is present in the range of 5 to 15 weight percent.

4. The article according to claim 2 wherein said silicon carbide is present in the range of 10 to 30 weight percent.

5. The article according to claim 2 wherein said first phase comprises 72 to 77 weight percent of alumina and 28 to 23 weight percent of silica.

6. The article according to claim 2 wherein said silica is provided by at least one of a silane compound and amorphous silica.

7. The article according to claim 6 wherein said silica is provided by 75 to 100 weight percent of a silane compound and 25 to 0 weight percent of amorphous silica.

8. The article according to claim 1 which is a fiber.

9. The article according to claim 1 which is a bubble, flake, granule, bead, or small molded shape.

10. A shaped article comprising a continuous alumina-boria-silica first phase, an in situ generated discontinuous carbon second phase, and a mechanically added discontinuous silicon carbide third phase, said first phase comprising 65 to 94 percent of a mixture of 60 to 65 weight percent alumina, 25 to 35 weight percent silica, and 0.25 to 15 parts by weight boria, said second phase comprising 1 to 5 weight percent carbon, and said third phase comprising 5 to 30 weight percent silicon carbide, said article being stable to an oxidative atmosphere when heated at 1300° C. for at least 2 hours.

11. The article according to claim 10 wherein said boria is present in the range of 0.25 to 5 weight percent of said article.

12. The article according to claim 10 wherein silicon carbide is present in the range of 10 to 30 weight percent.

13. A process for preparing a non-refractory shaped green article comprising the steps:
    (a) providing a viscous concentrate which is capable of providing said green article comprising 55 to 99 weight percent of the total composition of a mixture or chemical combination of
        (1) 65 to 80 weight percent alumina, and
        (2) 35 to 20 weight percent silica which is derived from 75 to 100 weight percent of an organosilane and 25 to 0 weight percent amorphous silica, and
        (3) 1 to 30 weight percent silicon carbide, viscous concentrate into a
    (b) shaping said viscous concentrate into a shaped form,
    (c) dehydratively or evaporatively gelling or hydrolyzing said shaped form to provide a green shaped article, and
    (d) drying said green shaped article to provide a non-refractory shaped green article.

14. The process according to claim 13 further comprising the step of firing said shaped green article at a temperature in a range of 900° to 1200° C. to provide a refractory alumina-silica containing shaped article.

15. The process according to claim 13 wherein said alumina is derived from at least one of a water-dispersible alumina sol and a water-soluble aluminum salt by calcining.

16. The process according to claim 13 wherein said organosilane has the formula $SiR_xR'_{(4-x)}$ wherein R and R' are independently either an organofunctional group or a hydrolyzable group, and x has a value of 0, 1, 2, 3, or 4.

17. The process according to claim 16 wherein R is alkoxy of $C_1$ to $C_6$, R' is an aliphatic amino or diamino group of $C_1$ to $C_6$, alkenyl group of $C_2$ to $C_6$, mercapto group of $C_0$ to $C_6$, epoxy, acryloxy, or methacryloxy of $C_2$ to $C_6$.

18. The process according to claim 13 wherein said amorphous silica is at least one of dry amorphous silica or liquid form silica sol.

19. The process according to claim 17 wherein said silane is tetraethoxysilane, gamma-aminopropyltrimethoxysilane, or gamma-glycidoxypropyltrimethoxysilane.

20. The process according claim 13 which provides a mullite fiber precursor containing 1 to 20 weight percent carbon.

21. The process according to claim 13 wherein said silicon carbide is partially oxidized prior to addition to the viscous concentrate.

22. The process according to claim 13 wherein said viscous concentrate further comprises sufficient boria precursor to provide 0.25 to 15 weight percent boria in said refractory article.

* * * * *

UNITED STATES PATENT AND TRADEMARK OFFICE
CERTIFICATE OF CORRECTION

PATENT NO. : 4,798,814

DATED : January 17, 1989

INVENTOR(S) : George F. Everitt et al.

It is certified that error appears in the above-identified patent and that said Letters Patent is hereby corrected as shown below:

Col. 4, line 11, delete "Niacet$^{198}$" and insert therefor -- Niacet$^{TM}$ --.

Col. 4, line 23, delete "perood" and insert therefor -- period --.

Col. 5, line 61, delete "." after the word "sol".

Col. 7, line 4, delete "SiO:" and insert therefor -- SiO$_2$ --.

Col. 8, line 67, delete "Young,s" and insert therefor -- Young's --.

Col. 10, line 63, delete "1 minutes" and insert therefor -- 10 minutes --.

Col. 11, line 29, delete "(See EXAMPLE 1}" and insert therefor -- (See EXAMPLE 1) --.

Col. 11, line 66, The caption "EXAMPLE 7" should be on a new line after a double space.

UNITED STATES PATENT AND TRADEMARK OFFICE
CERTIFICATE OF CORRECTION

PATENT NO. : 4,798,814

DATED : January 17, 1989

INVENTOR(S) : George F. Everitt et al.

It is certified that error appears in the above-identified patent and that said Letters Patent is hereby corrected as shown below:

Col. 12, line 1, delete "Niaproof$^{198}$" and insert therefor -- Niaproof$^{TM}$ --.

Col. 12, line 25, delete "Nalco$^{198}$" and insert therefor -- Nalco$^{TM}$ --.

Col. 12, line 31, delete "Astro$^{198}$" and insert therefor -- Astro$^{TM}$ --.

Col. 14, lines 17 - 18, delete "viscous concentrate into a".

Signed and Sealed this

Sixth Day of June, 1989

*Attest:*

*Attesting Officer*

DONALD J. QUIGG

*Commissioner of Patents and Trademarks*